(12) United States Patent
Veedu et al.

(10) Patent No.: US 8,399,089 B1
(45) Date of Patent: Mar. 19, 2013

(54) HIGHLY FLAME RETARDANT FOAM CONCRETE

(75) Inventors: Vinod P. Veedu, Honolulu, HI (US); Ian Kitajima, Waipahu, HI (US)

(73) Assignee: Oceanit Laboratories, Inc, Honolulu, HI (US)

( * ) Notice: Subject to any disclaimer, the term of this patent is extended or adjusted under 35 U.S.C. 154(b) by 431 days.

(21) Appl. No.: 12/315,236

(22) Filed: Dec. 1, 2008

Related U.S. Application Data

(60) Provisional application No. 61/004,668, filed on Nov. 30, 2007.

(51) Int. Cl.
*B32B 3/26* (2006.01)
*C04B 14/42* (2006.01)
*C04B 22/06* (2006.01)
*C04B 7/00* (2006.01)

(52) U.S. Cl. ............... 428/304.4; 428/318.4; 428/319.1; 428/446; 428/454; 428/703; 106/681; 106/711; 106/812

(58) Field of Classification Search .................. None
See application file for complete search history.

(56) References Cited

U.S. PATENT DOCUMENTS

| | | | | |
|---|---|---|---|---|
| 2003/0056695 | A1* | 3/2003 | Macklin et al. | 106/644 |
| 2003/0079438 | A1* | 5/2003 | Stephens et al. | 52/782.1 |
| 2008/0199723 | A1* | 8/2008 | Cho et al. | 428/684 |

OTHER PUBLICATIONS

J. Bohannon; '*Smart Coatings' Research Shows the Virtues of Superficiality; Science*, vol. 309; Jul. 15, 2005; pp. 376-377.
B. Marosfoi et al.; *Fire restarded polymer nanocomposites* ; *Current Applied Physics*; vol. 6; 2006; pp. 259-261.
L. E. Bell; *The Foam Home*; Smart Homeowner; May/Jun. 2006 (3 pages).

\* cited by examiner

*Primary Examiner* — David Sample
(74) *Attorney, Agent, or Firm* — James Creighton Way

(57) ABSTRACT

A nanomaterial based admixture improves the fire retardancy of foam-based GFRC material to a minimum of 3 hours, creating Nano GFRC. A dispersion of nanoclay in water is prepared by heating water to 80-90 ° C., adding the desired amount of nanoclay and stirring with a magnetic stirrer for 30-45 minutes, producing a stable and uniform dispersion. Concrete is made by mixing sand, acryl, water, nanoclay solution, and cement in a bucket, adding enough water reducer to thin the mixture enough to stir, adding fibers, and mixing the composite using a rotor for about 10 minutes. Polystyrene foam is sandwiched with the prepared mixture on all sides to make the concrete. This resulting concrete is lightweight and strong, reduces CO and $CO_2$ emissions by a factor of three compared to standard GFRC, and shows dramatic improvement in fire retardant properties.

26 Claims, 5 Drawing Sheets

Base GFRC

5% Nanoclay GFRC

HIGHLY FLAME RETARDANT FOAM CONCRETE

This application claims the benefit of U.S. Provisional Application No. 61/004,668, filed Nov. 30, 2007, which is hereby incorporated by reference in its entirety.

TECHNICAL FIELD OF THE INVENTION

The present invention relates to the fields of consumer packaging, protective coatings and flame resistant construction materials.

BACKGROUND OF THE INVENTION

Advanced foam core/glass fiber composite materials are emerging as one of the best candidates for building construction. Many exciting merits such as a superior strength to weight ratio, low cost, flexibility of manufacturing and disposal of industrial waste, project Glass Fiber Reinforced Concrete (GFRC) as a leading candidate for next generation construction material. Using this technology, different manufacturers design and construct sandwich composite homes, using panels of expanded polystyrene, which were coated on either side after assembly with GFRC. The fusion of the concrete composite and polystyrene provides sufficiently high structural strength that the entire house, including walls, floors, ceilings and roof, could be built without standard wood framing, nails, screws and bolts. However, the poor fire rating of their GFRC material prevents them from building commercial buildings and going to a wider market.

The current solution for the above stated problem would be to use flame retardant coatings. These types of coatings have been widely used since the 1970s, but they have a serious drawback. Recent research shows that, more than 90% of fire related deaths are not caused by the flames but by the emission of toxic and corrosive gases—many of which come from the fire-retardant coatings themselves. So it becomes extremely important to develop alternative solutions. Researchers have developed a way of coating surfaces with nanoparticles of flame-retardant oxides of aluminum or silicon. This requires high temperature during application, limiting its use to steel and aluminum rather than the inside walls of houses where it is most needed.

Needs exist for improved flame-retardant materials, particularly for construction.

SUMMARY OF THE INVENTION

Tailored functionalized nanomaterials have the potential to improve flame retardant properties significantly. A new materials formulation fabricates highly flame retardant fiber reinforced concrete/foam sandwich composite materials. Because flame retardant nanomaterial is incorporated during the manufacture of composite concrete, no additional coating is required. The introduction of functionalized nanomaterial for flame retardant performance in composite materials is a novel approach. This material also dramatically reduces the emission of toxic gases during fire.

This invention has great commercial value in extending the commercial potential of light weight materials used in structural construction, as this invention helps improve their strength and flame retardancy.

This invention:
1) Increases the flame retardancy of foam based construction materials.
2) Dramatically reduces the emission of toxic gases during fire.
3) Increases the structural performance of the construction material.

This invention makes the construction material itself multifunctional. The employed methods are simple to follow and technically sound. No additional processing is required.

A nanomaterial based admixture improves the fire retardancy of foam-based GFRC material to a minimum of 3 hours; currently the rating is 15 minutes. Improving the fire retardancy of the material qualifies manufacturers to compete in an emerging multi-billion dollar structural composite market. Currently, codes allow foam-based GFRC to be used only for non-structural walls in residential housing, but with an improved rating the material may be used for 100% of the structural portions of both residential and commercial buildings.

The foam based GFRC construction basically consists of at least cement, fine aggregate, water, alkali-resistant glass fibers and additives (such as plasticizer, shrinkage-resistant additives, curing agents, etc.) which, when mixed in exact proportions and manufactured under controlled conditions with special equipment such as concrete mixers, sprayers etc., achieves construction-grade physical properties. The proportion of different materials in the composition could be customized based on the targeted performance.

Some of their many attractive properties include: far greater relative strength to weight ratio than that of ordinary hard rock precast concrete, high mechanical performances, excellent freeze/thaw resistance, resistance to environmental degradation and corrosion under the attack of chemicals, easy adaptation to any shape of the concrete, allowing flexibility in design, and that they are an environmentally friendly composite made of natural raw materials with low energy consumption. Moreover, since polystyrene is resistant to water, there is literally no moisture condensation, mold and mildew, or the destructive effects of floodwater. In addition, the absence of wood keeps termites and other pests away.

Nanoclay is used as a fire retardant nanoparticle. The nanoclay is functionalized to tailor towards hydrophilic behavior and to disperse in water. It merits notice that the hydrophilic construction material, GFRC foam concrete, uses water as one of the constituents and having a water based nanoclay admixture is the ideal means to introduce the fire retardant nanoclay materials uniformly into the concrete. An admixture based on nanoclay and incorporated into the GFRC foam concrete was tested for fire ratings.

A new highly flame retardant fiber reinforced concrete composite material includes a concrete mixture comprising fine aggregate, cement, water, glass fibers, additives, and nanoclay dispersion. Foam may be sandwiched with the concrete mixture. The foam may be a structural foam or derivative composite. The concrete mixture may also include acryl and the additives may include water reducer. In one embodiment, the fine aggregate makes up 30-60% of the concrete mixture by weight, cement 30-60%, water 1-10%, glass fibers 1-10%, water reducer 1-5%, nanoclay dispersion 1-15%, and acryl 1-10%. The fine aggregate may be sand. Under high temperature conditions the material may have CO and $CO_2$ emissions reduced by a factor of three compared to standard GFRC.

In a new method of preparing a nanoclay dispersion, water is heated to 80-90° C. and nanoclay is added to the water while the water is stirred. The water continues to be stirred until a uniform solution is observed. The temperature of the water is maintained between 80 and 90° C. while it is stirred and the solution is allowed to cool. The nanoclay added to the water may be an amount equal to 2-10% of the total weight of the solution. In one embodiment, the nanoclay added to the water is an amount equal to 5% of the total weight of the solution, while in another embodiment the nanoclay added to the water is an amount equal to 7% of the total weight of the solution. In stirring the water, the water may be stirred with a magnetic stirrer at 900-1000 rpm.

In a new method of preparing a highly flame retardant fiber reinforced concrete composite material, fine aggregate, water, nanoclay solution, and cement are mixed into a composition. Water reducer is added to make the composition thin enough to stir, glass fibers are added to the composition, and the composition is mixed. In one embodiment, an additive is mixed into the composition at the same time as the aggregate, water, nanoclay solution, and cement are mixed into the composition. The additive may include acryl.

In mixing the composition, a rotor may be used for about 10 minutes. Foam may be sandwiched with the mixed composition. In one embodiment, the fine aggregate makes up 30-60% of the final mixed composition by weight, cement 30-60%, water 1-10%, glass fibers 1-10%, water reducer 1-5%, nanoclay dispersion 1-15%, and acryl 1-10%.

A new flame retardant fiber reinforced concrete composite structure includes the highly flame retardant fiber reinforced concrete composite material including fine aggregate, cement, water, glass fibers, additives, and nanoclay dispersion. A new flame retardant fiber reinforced concrete/foam sandwich composite structure includes foam sandwiched with the highly flame retardant fiber reinforced concrete composite material including fine aggregate, cement, water, glass fibers, additives, and nanoclay dispersion.

These and further and other objects and features of the invention are apparent in the disclosure, which includes the above and ongoing written specification, with the claims and the drawings.

DETAILED DESCRIPTION OF THE PREFERRED EMBODIMENTS

To manufacture the GFRC incorporated with Nanoclay (Nano GFRC), a dispersion of nanoclay in water is prepared. Two different concentrations of nanoclay-water dispersions were prepared: 5% and 7%. 7% by weight has been determined to be the highest possible uniform dispersion amount of nanoclay in water. Agglomerations of nanoclay were observed above the 7% limit. Typical process of dispersion follows the steps below:
1. The required amount of water is heated to 80-90° C.
2. When the water temperature stabilizes between 80-90° C., add the calculated amount of nanoclay while stirring the water using a magnetic stirrer (900-1000 rpm).
3. Make sure that the water temperature is always maintained between 80-90° C.
4. The stirring process should continue for about 30-45 minutes. Once a uniform solution is observed, turn off the heater and let the solution cool down.

Figure 1:
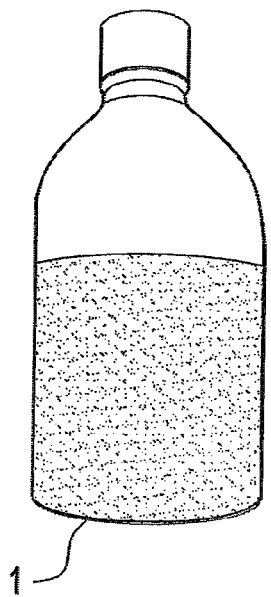
FIG. 1 is a photograph of a functionalized nanoclay dispersion in water.

The nanoclay dispersion in water prepared based on the above protocol is stable for months, see FIG. 1. FIG. 1 is a photograph of a stable functionalized nanoclay dispersion in water 1. The prepared nanoclay water dispersion is used to manufacture GFRC composite. The ingredients of the GFRC composite are listed in Table 1.

TABLE 1

| GFRC composite ingredients | | | | | | | |
|---|---|---|---|---|---|---|---|
| Area | Sand (lb) | Acryl (lb) | Cement (lb) | Water (lb) | Water reducer | Glass Fiber (lb) | Nanoclay dispersion (lb) |
| 6.33 sq ft | 9 | 1.09 | 9 | 1 | 0.7 oz | 0.54 | 1 |

The typical GFRC manufacture procedure involves the following steps:
1. Making concrete mixture:
   a. Mix sand, acryl, water, nanoclay solution, and cement in bucket.
   b. Add enough water reducer to thin mixture enough to stir.
   c. Add fibers.
   d. Mix the composite using a rotor for about 10 minutes.
2. Polystyrene foam is sandwiched with 0.5 inch of the above prepared GFRC mixture in all sides to make the concrete.

Figure 2:
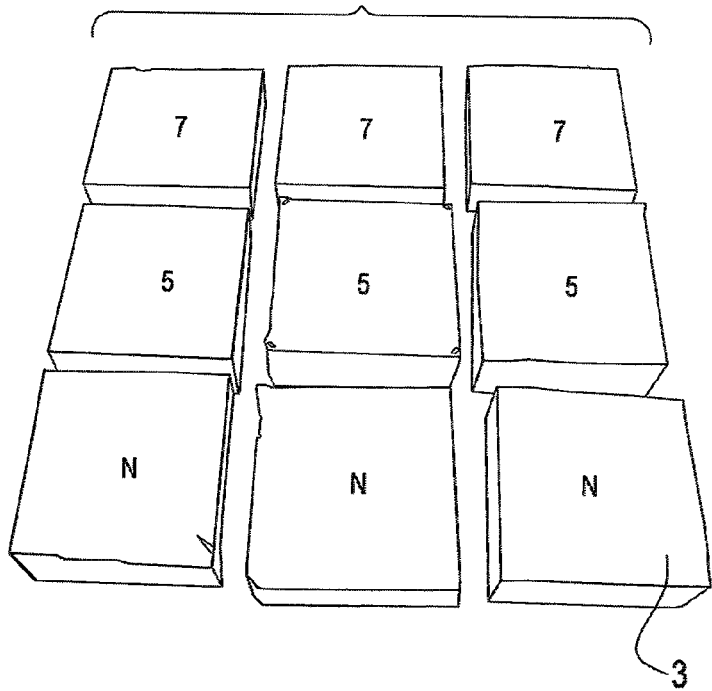
FIG. 2 is a photograph of manufactured GFRC specimens with different nanoclay loading.
Figure 3:
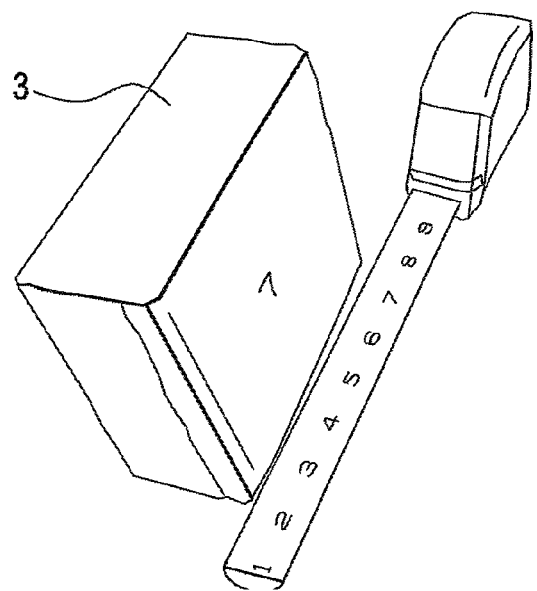
FIG. 3 is a photograph showing the dimensions of a manufactured GFRC specimen.

Based on the above steps, three 5 in×5 in×2 in samples were manufactured each of base GFRC, 5% nanoclay Nano GFRC and 7% nanoclay Nano GFRC (9 samples total). FIG. 2 shows the manufactured GFRC samples 3 with different nanoclay loadings and FIG. 3 shows a single specimen 3 with dimension.

Figure 4:
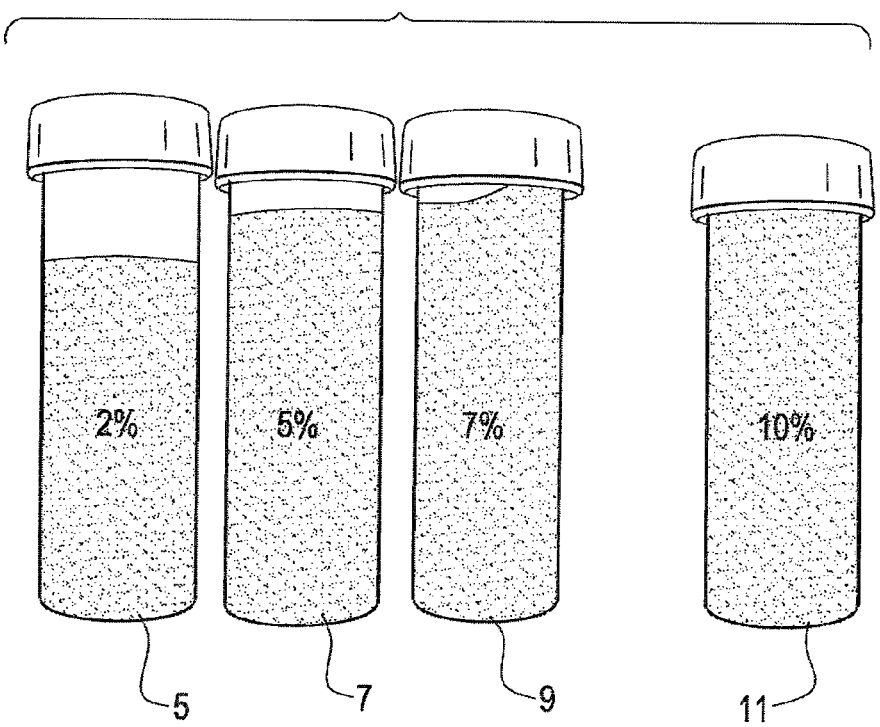
FIG. 4 is a photograph of nanoclay dispersions in water with different weight fractions of the Nanoclay.

Nanoclay dispersions with different volume fractions of the clay material were prepared and observed for dispersion stability. Dispersions with 2%, 5%, 7% and 10% nanoclay weight fractions in water 5, 7, 9, 11, respectively, were prepared as shown in FIG. 4. Up to 7% weight fraction of nanoclay in water yields a uniform dispersion. The 10% solution is very thick and non-uniform. All the dispersions are stable for more than a month.

Figure 5:
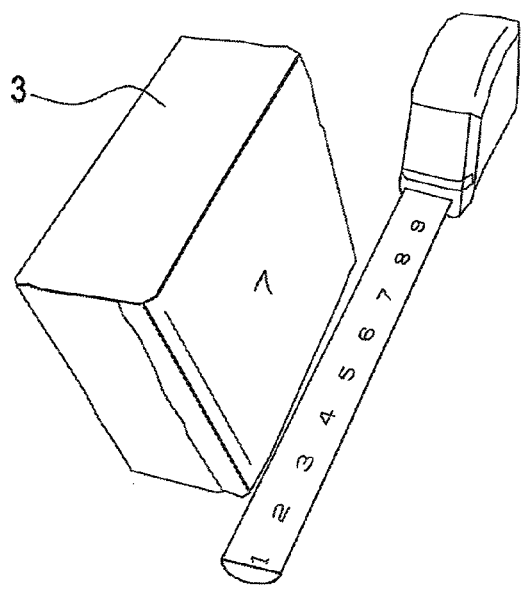
FIG. 5 is a GFRC specimen used in a fire rating test with a tape measure showing its dimensions.
Figure 6:
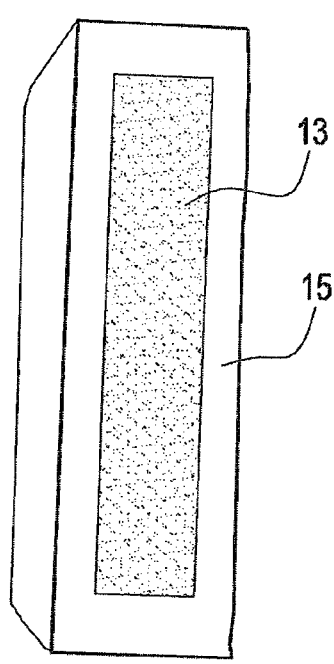
FIG. 6 is a photograph of a cross-section view of a GFRC specimen used in a fire rating test.

FIG. 5 shows a photograph of one of the GFRC specimens 3 and FIG. 6 shows its cross-section with GFRC skin 15 and polystyrene foam core 13.

Three types of specimens were sent for fire testing using cone calorimeter to the Fire Protection Engineering facility at Worcester Polytechnic Institute, MA. These specimens (base GFRC, and 5% nanoclay GFRC and 7% nanoclay GFRC) have been subjected to fire testing based on the standard ASTM E 1354. Following are the key observations:

Base GFRC - specimen produced a small amount of white\gray smoke, specimen cracked through the top and along side, specimen ignited slightly with blue cellular flames coming from cracks.

5% Nanoclay GFRC - specimen did not ignite, no ignition flashes occurred, specimen produced white\gray smoke throughout test 7% Nanoclay GFRC - specimen did not ignite for any sustained burn however 6 small ignition, flashes occurred between 780 and 920 seconds, a small amount of white\gray smoke occurred throughout test.

Figure 7:
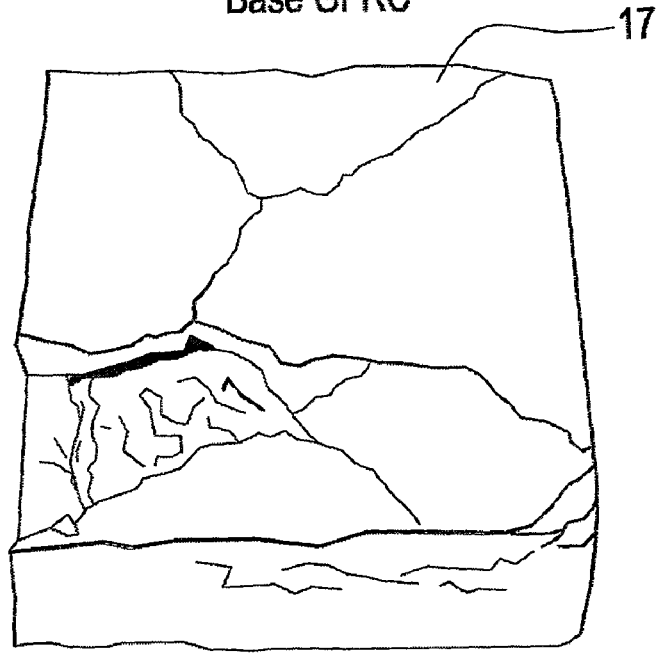
FIG. 7 is a photograph of a base GFRC specimen after the fire test.
Figure 8:
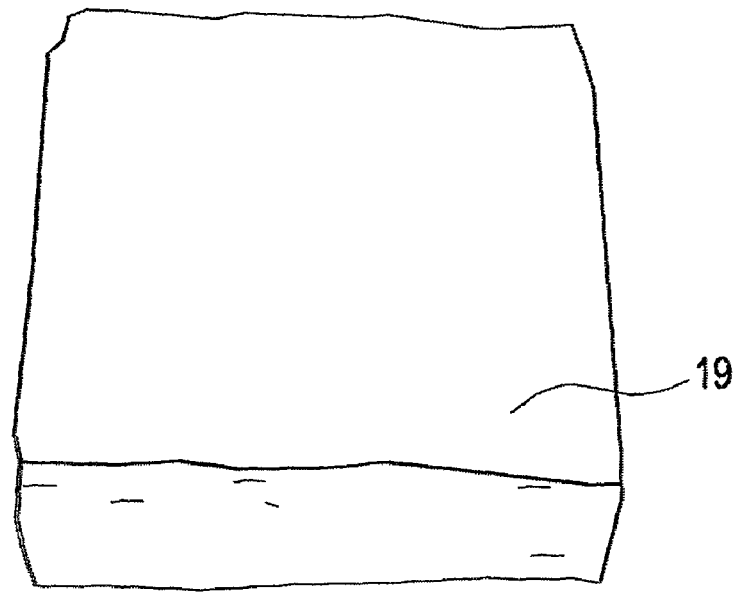
FIG. 8 is a photograph of a 5% Nanoclay GFRC specimen after the fire test.

FIGS. 7 and 8 show the post-test specimens from the fire test. FIG. 7 shows a base (no-nanoclay) GFRC specimen 17 and FIG. 8 shows a 5% nanoclay Nano GFRC specimen 19. As mentioned above the 5% nanoclay Nano GFRC shows no obvious damage. The base GFRC shows significant structural damage.

The 5% nanoclay GFRC performed best - specimen did not ignite, no ignition flashes occurred, specimen produced white\gray smoke throughout test. CO and CO2 emissions were reduced by a factor of three in the nanoclay GFRC compared to the control specimen. Also, visual inspection of the post test specimen indicates the structural integrity.

The nanoclay based foam GFRC structural material shows dramatic improvements in reducing the toxic gas release as well as fire retardancy performances. Moreover, the nanoclay materials may act as molecular rebars, resulting in enhanced mechanical performances.

Figure 9:
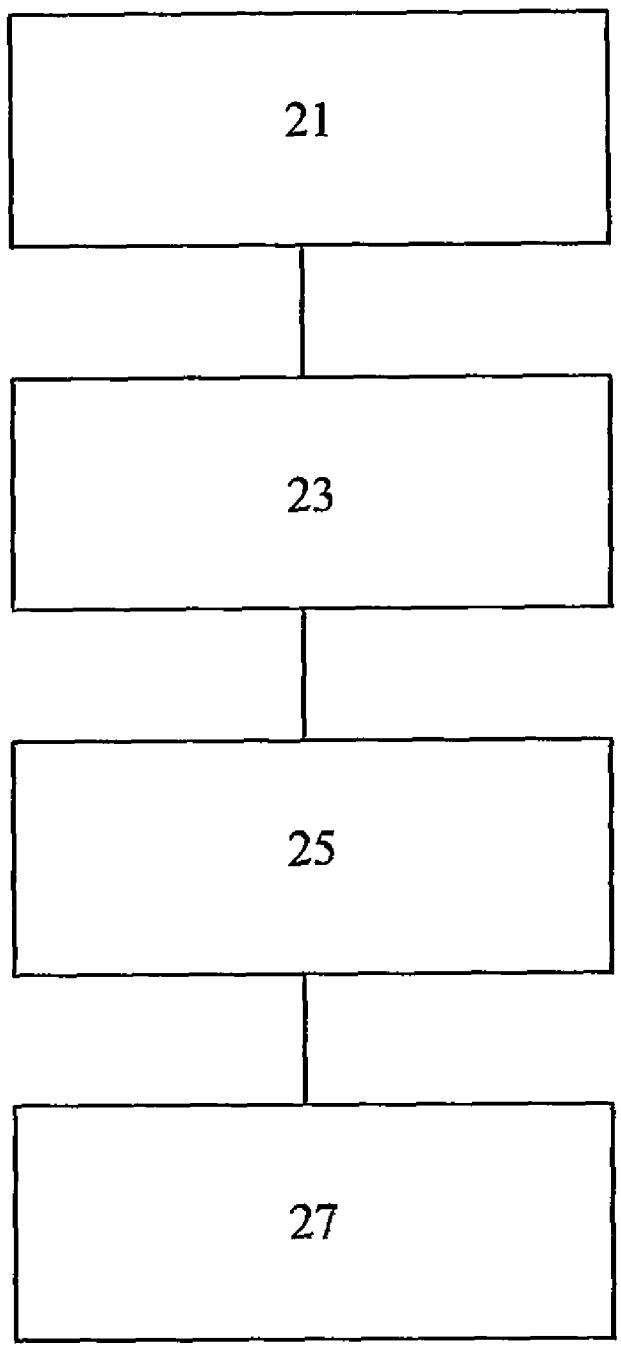
FIG. 9 is a diagram illustrating a method of preparing a nanoclay dispersion.

FIG. 9 illustrates a method of preparing a nanoclay dispersion. Water is heated to 80-90° C. 21, nanoclay is added to the water while stirring the water 23, the water continues to be stirred 25 until a uniform solution is observed, during which the temperature of the water is maintained between 80 and 90° C., and the solution is allowed to cool 27. The stirring may be done with a magnetic stirrer at 900-1000 rpm.

Figure 10:
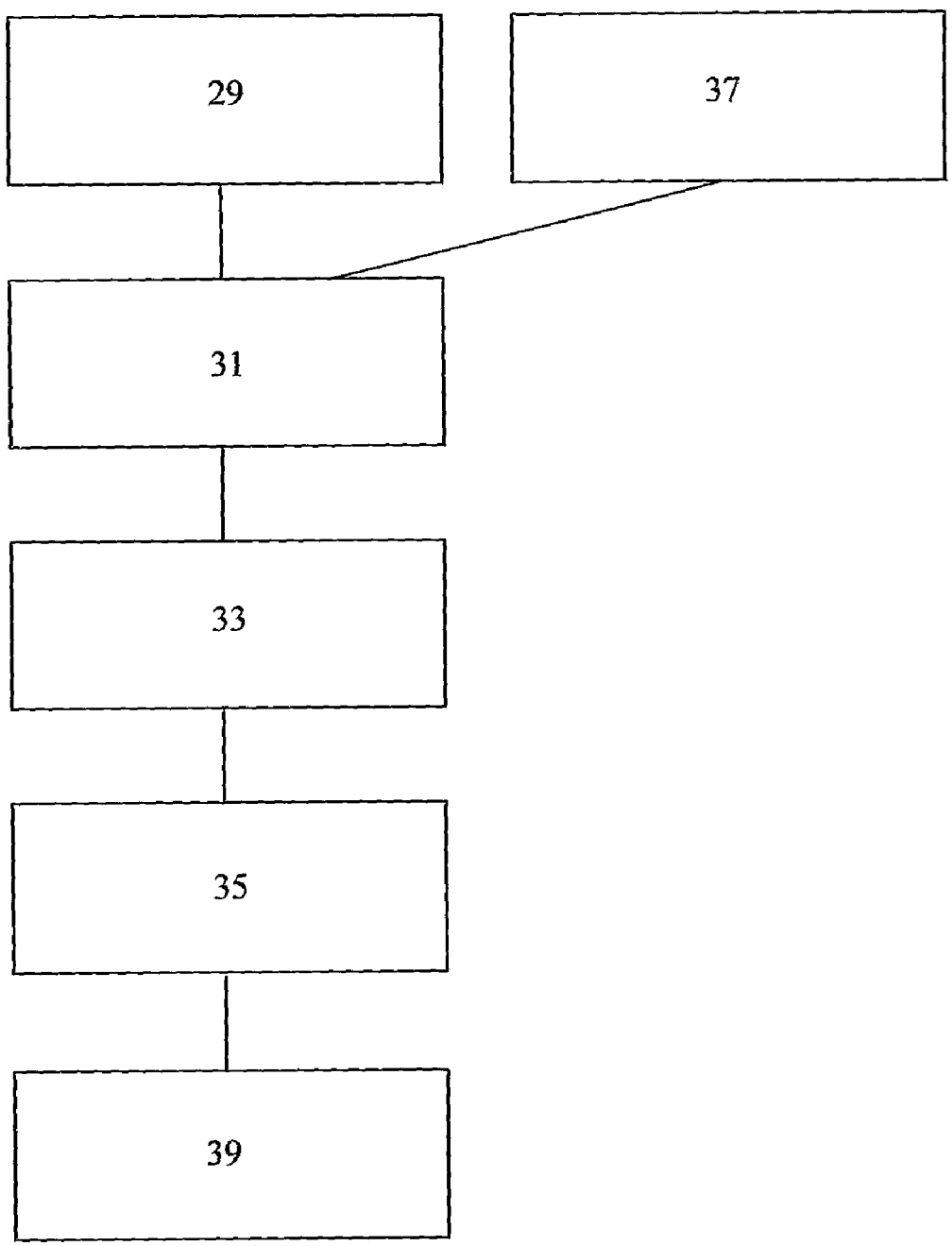
FIG. 10 is a diagram illustrating a method of preparing a highly flame retardant fiber reinforced concrete composite material.

FIG. 10 illustrates a method of preparing a highly flame retardant fiber reinforced concrete composite material. Fine aggregate, water, nanoclay solution, and cement are mixed into a composition 29, water reducer is added 31 to make the composition thin enough to stir, glass fibers are added to the composition 33, and the composition is mixed 35. An additive may be mixed into the composition 37 at the same time as the aggregate, water, nanoclay solution, and cement are mixed into the composition 29. The mixing the composition 35 may be done using a rotor for about 10 minutes. Foam may be sandwiched with the mixed composition 39.

While the invention has been described with reference to specific embodiments, modifications and variations of the invention may be constructed without departing from the scope of the invention, which is defined in the following claims.

We claim:

1. A flame retardant fiber reinforced concrete composite material, comprising a concrete mixture further comprising fine aggregate, cement, water, glass fibers, additives, and nanoclay dispersion, and a foam sandwiched with the concrete mixture, wherein the foam is a structural foam or derivative composite, wherein the concrete mixture further comprises acryl and the additives comprise water reducer, and wherein the fine aggregate makes up 30-60% of the concrete mixture by weight, cement 30-60%, water 1-10%, glass fibers 1-10%, water reducer 1-5%, nanoclay dispersion 1-15%, and acryl 1-10%.

2. The concrete composite material of claim 1, wherein the fine aggregate is sand.

3. The concrete composite material of claim 1, wherein the material under fire testing based on the standard ASTM E 1354 has CO and $CO_2$ emissions reduced by a factor of three compared to standard GFRC without the nanoclay dispersion.

4. A flame retardant fiber reinforced concrete composite structure, comprising the flame retardant fiber reinforced concrete composite material of claim 1.

5. The flame retardant fiber reinforced concrete composite structure of claim 4, wherein the resulting concrete reduces CO and $CO_2$ emissions by a factor of three compared to glass fiber reinforced concrete without the nanoclay dispersion under fire testing based on the standard ASTM E 1354.

6. A flame retardant fiber reinforced concrete/foam sandwich composite structure, comprising the flame retardant fiber reinforced concrete composite material of claim 1.

7. A fiber reinforced concrete composite material, comprising a concrete mixture further comprising fine aggregate, cement, water, glass fibers, additives, and nanoclay dispersion, wherein the nanoclay is functionalized to be hydrophilic in the concrete mixture, wherein the nanoclay dispersion makes up approximately 1-15% of the concrete mixture by weight, and a foam sandwiched with the concrete mixture, wherein the foam is a structural foam or derivative composite.

8. The fiber reinforced concrete composite material of claim 7, wherein the concrete mixture further comprises acryl and the additives comprise water reducer.

9. The fiber reinforced concrete composite material of claim 8, wherein the fine aggregate makes up approximately 30-60% of the concrete mixture by weight, cement 30-60%, water 1-10%, glass fibers 1-10%, water reducer 1-5%, and acryl 1-10%.

10. The fiber reinforced concrete composite material of claim 7, wherein the fine aggregate is sand.

11. The fiber reinforced concrete composite material of claim 7, wherein the nanoclay dispersion makes up approximately 2-10% of the total weight of the concrete mixture.

12. The fiber reinforced concrete composite material of claim 11, wherein the nanoclay dispersion makes up approximately 5% of the total weight of the concrete mixture.

13. The fiber reinforced concrete composite material of claim 11, wherein the nanoclay dispersion makes up approximately 7% of the total weight of the concrete mixture.

14. The fiber reinforced concrete composite material of claim 7, wherein the material under fire testing based on the standard ASTM E 1354 has CO and $CO_2$ emissions reduced by a factor of three compared to standard GFRC without the nanoclay dispersion.

15. The fiber reinforced concrete composite material of claim 7, wherein the resulting concrete reduces CO and $CO_2$ emissions by a factor of three compared to glass fiber reinforced concrete without the nanoclay dispersion under fire testing based on the standard ASTM E 1354.

16. A method of preparing a highly flame retardant fiber reinforced concrete composite material, comprising a concrete mixture comprising fine aggregate, cement, water, glass fibers, additives, and nanoclay dispersion, and a foam sandwiched with the concrete mixture, wherein the foam is a structural foam or derivative composite, wherein the concrete mixture further comprises acryl and the additives comprise water reducer, and wherein the fine aggregate makes up 30-60% of the concrete mixture by weight, cement 30-60%, water 1-10%, glass fibers 1-10%, water reducer 1-5%, nanoclay dispersion 1-15%, and acryl 1-10%, further comprising initially preparing the nanoclay dispersion, comprising heating water to 80-90° C., adding nanoclay to the water while stifling the water, continuing to stir the water until a uniform solution is observed, maintaining the temperature of the water between 80 and 90° C. while stirring, and allowing the solution to cool.

17. The method of claim 16, wherein the nanoclay added to the water is an amount equal to 2-10% of the total weight of the solution.

18. The method of claim 17, wherein the nanoclay added to the water is an amount equal to 5% of the total weight of the solution.

19. The method of claim 17, wherein the nanoclay added to the water is an amount equal to 7% of the total weight of the solution.

20. The method of claim 16, wherein stirring the water comprises stirring the water with a magnetic stirrer at 900-1000 rpm.

21. A method of preparing a highly flame retardant fiber reinforced concrete composite material, comprising a concrete mixture comprising fine aggregate, cement, water, glass fibers, additives, and nanoclay dispersion, wherein the nanoclay is functionalized to be hydrophilic in the concrete mixture, wherein the nanoclay dispersion makes up approximately 1-15% of the concrete mixture by weight, and a foam sandwiched with the concrete mixture, wherein the foam is a structural foam or derivative composite, further comprising mixing the fine aggregate, the water, the nanoclay dispersion, and the cement into a composition, adding water reducer to make the composition thin enough to stir, adding glass fibers to the composition, and mixing the glass fibers with the composition.

22. The method of claim 21, further comprising mixing the additives into the composition at the same time as the aggregate, the water, the nanoclay dispersion, and the cement are mixed into the composition.

23. The method of claim 22, wherein the additives comprise acryl.

24. The method of claim 21, wherein the mixing the composition is done using a rotor for about 10 minutes.

25. The method of claim 21, further comprising sandwiching the foam with the mixed composition.

26. The method of claim 21, wherein the fine aggregate makes up 30-60% of the final mixed composition by weight, cement 30-60%, water 1-10%, glass fibers 1-10%, water reducer 1-5%, nanoclay dispersion 1-15%, and acryl 1-10%.

* * * * *